United States Patent [19]

Martinelli et al.

[11] Patent Number: 5,434,594
[45] Date of Patent: Jul. 18, 1995

[54] COMPUTER PERIPHERAL DEVICE FOR POSITIONING A CURSOR ON A COMPUTER DISPLAY

[75] Inventors: John K. Martinelli; John B. Barrett, both of Paso Robles, Calif.

[73] Assignee: Apt, Inc., Paso Robles, Calif.

[21] Appl. No.: 630,104

[22] Filed: Dec. 19, 1990

[51] Int. Cl.⁶ .................................. G09G 3/02
[52] U.S. Cl. ............................ 345/163; 345/179
[58] Field of Search ............ 340/710, 709, 706, 712; 178/18, 19; 345/156, 180, 170, 163, 164, 179

[56] References Cited

U.S. PATENT DOCUMENTS

| | | | |
|---|---|---|---|
| 3,376,551 | 5/1964 | Armbuster | 340/710 |
| 4,464,652 | 8/1984 | Lapson et al. | 340/716 |
| 4,559,532 | 12/1985 | Hosogoe | 340/710 |
| 4,623,787 | 11/1986 | Kim | 340/710 |
| 4,780,707 | 10/1988 | Selker | 178/18 |
| 4,801,931 | 1/1989 | Schmidt | 340/710 |

FOREIGN PATENT DOCUMENTS 0143581 11/1984 European Pat. Off. .

*Primary Examiner*—Ulysses Weldon
*Assistant Examiner*—Amare Mengista

[57] ABSTRACT

An improved peripheral device for a computer includes a miniature motion-sensing mechanism which is placed in a pen-shaped body to allow computer input to be accomplished by a user in the familiar form of a pen or pencil. The mechanism include a rolling ball supported at six points by support shafts whose movement in response to ball motion is converted into signals indicative of the direction and magnitude of the movement of the device.

3 Claims, 4 Drawing Sheets

COMPUTER PERIPHERAL DEVICE FOR POSITIONING A CURSOR ON A COMPUTER DISPLAY

BACKGROUND OF INVENTION

1. Field of Invention

This invention relates to a computer graphic input device known as a mouse and more specifically to structure which allows the miniaturization of the mouse so that it can be placed in a ball point pen-like body, and to the associated ergonomics of this placement.

2. Description of Prior Art

A mouse is a computer input device used for positioning a cursor on a computer video display. A typical embodiment of a mouse includes an enclosure that lies flat on a work space, one or more user-actuated switches or buttons located externally of the enclosure, X and Y motion sensors, electrical interface circuitry, and a cable to connect the mouse to a host computer and video display. The switches, often in the form of push buttons, enable alteration of the program flow in the host computer. In operation, when the mouse is moved on a flat surface by the user, the motion sensors sense the movement in the directions of the X and Y planes. The interface circuitry, typically located within the mouse enclosure, converts the raw movement and switch information into digital information which is supplied to the host computer. Software in the host computer utilizes the motion and switch information to perform different functions,, for example, repositioning the cursor on the computer display screen.

Mice of the above described type are normally classified by the manner in which the motion is detected, the principal motion detection methods being mechanical and optical. Mechanical mice usually employ a technique whereby a spherical ball protrudes slightly below the bottom of the mouse enclosure and is free to roll as the mouse is moved by the user along a flat and level drawing surface. Inside the enclosure, the rolling ball is coupled to a pair of orthogonally mounted shaft position encoders. The mechanical mouse motion is thereby converted by the encoders into two pairs of quadrature signals, one pair for each axis of motion, thereby providing the required direction and displacement information corresponding to the mouse movement.

The mechanical mouse requires that both the ball and the enclosure be in contact with the drawing surface. This limits the mechanical mouse to use on an essentially level surface so that the ball is held against the drawing surface by gravity. Also, due to the limits at which the ball can travel in and out of the enclosure, it will not function properly, if at all, on curved surfaces. A further limitation of the mechanical mouse is that when in the process of lifting the mouse or when pressing the mouse into a soft surface, the orthogonally mounted encoding shafts detect a ball position change with respect to the enclosure, false position data can be sent to the host computer.

Optical mice utilize a light source in the base of the mouse enclosure, light therefrom being reflected onto one or more photodetectors from a specifically patterned surface over which the mouse is moved. Typically, a single chip computer translates the changes in detected luminance into direction and displacement information which is utilized by the host computer in the manner described above. Like mechanical mice, an optical mouse requires an essentially flat level surface.

SUMMARY OF THE INVENTION

The present invention overcomes the above problems of the prior art mechanical and optical mice and their flat, level surface requirements by supporting the ball in a six point contact bearing system, with the ball placed between the bearing structure and the drawing surface. This results in a friction-activated ball movement, allowing the mouse to function on any surface angle and even function on curved or irregular surfaces.

The structure of the present invention also allows the mouse to be lifted from the surface without sensing changes in position. This is accomplished because, as the enclosure and ball are lifted away from the drawing surface, the ball loses contact with the bearing structure and no movement is produced or detected. The present invention allows the ball size to be made very small, since the mechanism does not depend on gravity to place the ball against the drawing surface. Pressure as employed with a pen or pencil is used, thus allowing miniaturization of the mechanism so that it will fit in a ball point pen-like enclosure and used in a manner similar to a writing instrument. By employing a pen-like body as a housing, the user may depress the mouse buttons in the same fashion whether the user is left handed or right handed. This is accomplished due to the button placement, with the primary button in front of the other button or buttons along the length of the housing.

DESCRIPTION OF PREFERRED EMBODIMENT

Figure 1:
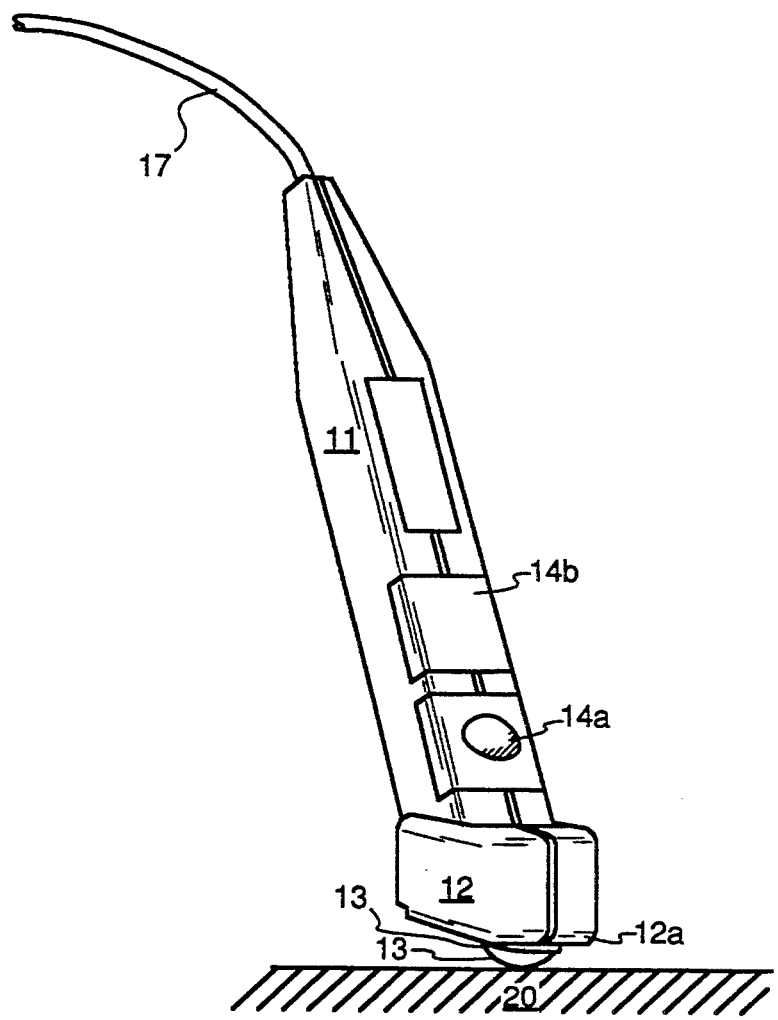
FIG. 1 is a perspective view of a device embodying the present invention.

Referring to the perspective view of FIG. 1, the mouse of this invention includes an elongated pen-like housing 11 having at one end thereof a head portion 12 containing the majority of the working components of the device. This includes a rotatable ball 13 which protrudes from an opening in a retaining plate 12a which is hinged to head 12 to permit removal and replacement of ball 13 if necessary. When in use, ball 13 contacts an appropriate drawing surface to rotate the ball. This motion of ball 13 is converted to its X and Y axis components by means of sensing and encoding means in head 12, as will be described in detail in connection with FIGS. 2, 3 and 4.

Housing 11 is provided along its length with spaced control buttons or switches 14a, 14b which are operated by a user of the mouse to perform different functions relative to the video display and host computer. Buttons 14a, 14b are aligned along the length of housing 11, rather than side by side as in prior art mice. Buttons 14a, 14b are placed in a location where both right handed and left handed users have the same access to them. While the number of buttons may be increased beyond the two shown, they all preferably are located in line and not side by side.

Housing 11 has at its end opposite to head 12 a cable 17 for communicating between the mouse and the video display and host computer. Cable 17 may connect to a standard computer interface such as the RS232 interface which provides control and data exchange between the host computer and the attached peripheral device.

Figure 2:
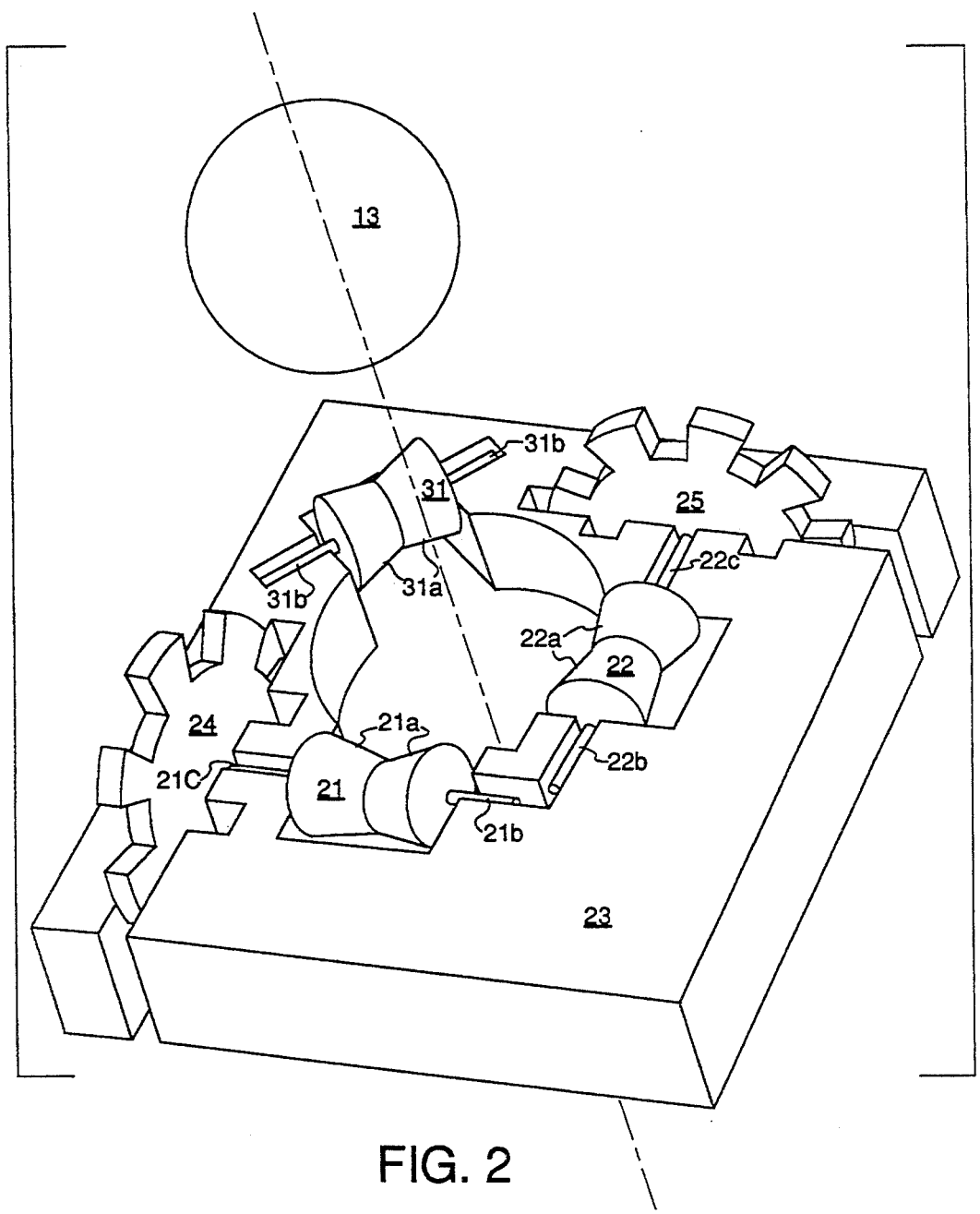
FIG. 2 is an exploded perspective view of the rolling ball and support shaft structure of this invention.
Figure 3:
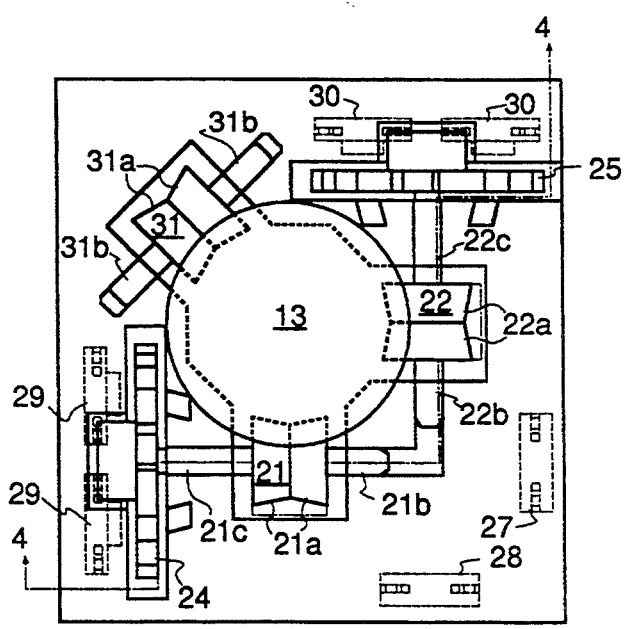
FIG. 3 is a bottom plan view of the head of the pen-like device of this invention.
Figure 4:
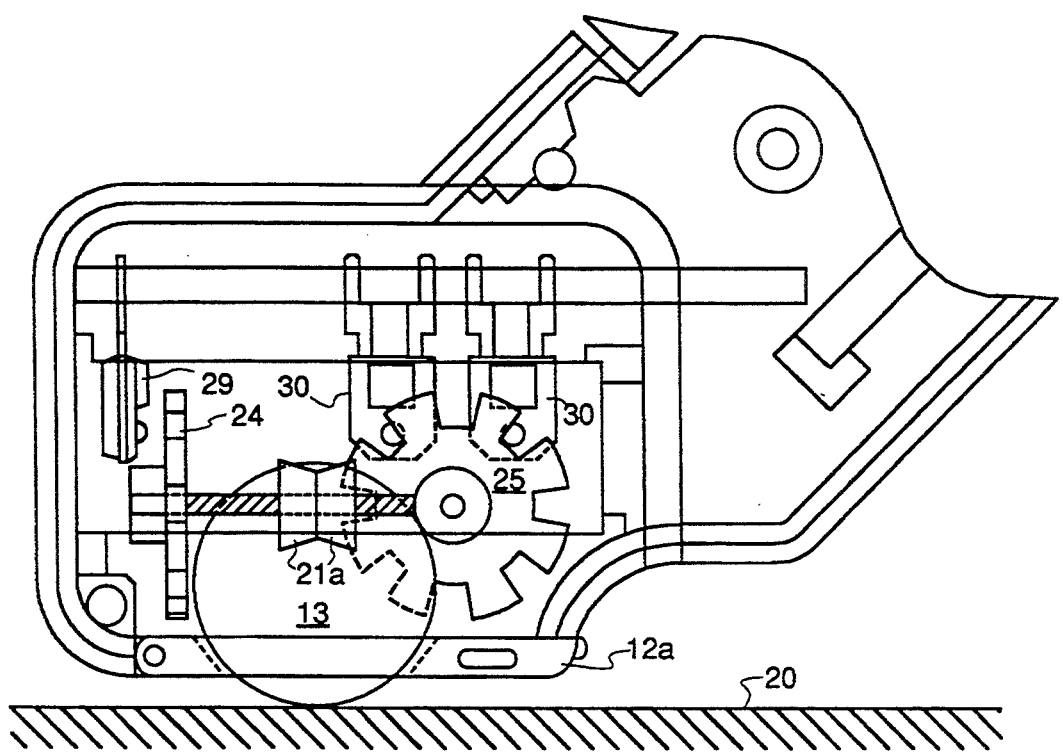
FIG. 4 is a side elevation cross sectional view of the head assembly along plane 4—4 of FIG. 3.

Referring to FIG. 2, ball 13, shown in exploded position with retaining plate 12a removed, is illustrated in relation to the encoding mechanism within head 12. This encoding mechanism includes a pair of encoding support shaft rollers 21 and 22 having their axes disposed at 90 degrees to each other. Shafts 21, 22 each have pairs of conical surfaces 21a, 22a, respectively, which engage the outer surface of ball 13 at two points and are rotated by contact with the ball. Shafts 21, 22 each have one end 21b, 22b, respectively, journalled in a housing 23 and have their other ends 21c, 22c connected to drive rotatable encoding disks or chopper disks 24, 25, respectively. Chopper disks 24, 25 are conventional in the art and operate in a well known manner to modulate beams of light from their respective light sources such as photo diodes 27, 28 (FIGS. 3 and 4). The modulated light is sensed by associated pairs of photodetectors 29, 30 to produce output signals therefrom corresponding to the components of the movement of ball 13 in the X and Y axes direction, respectively.

The structure of the invention also includes an idler support shaft roller 31 (FIGS. 2 and 3) having two conical surfaces 31a which bear against the surface of ball 13 and contact it at two points. The two ends 31b of idler shaft 31 are journalled in housing 23, since shaft 31 does not function to drive an encoding disk. The axis of shaft 31 is preferably aligned in a plane with the axes of shafts 21, 22.

Figure 5:
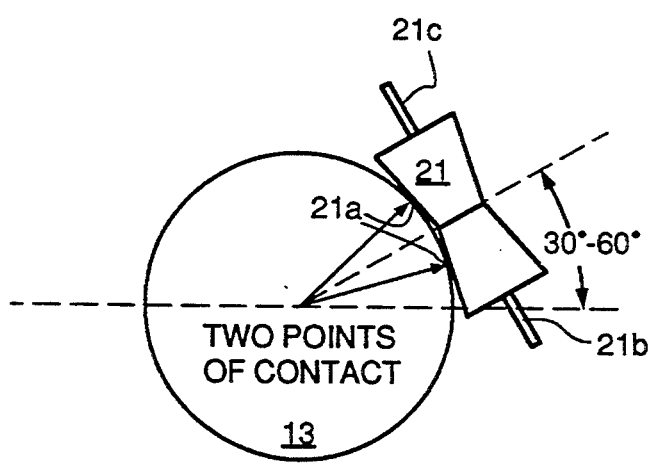
FIG. 5 is a bottom plan view showing the nature of the contact between the rolling ball and one of the support shafts.

FIG. 5 depicts the ball-to-shaft contact relationship for the shafts 21, 22, 31. Illustrated shaft 21 shows the contact area at two places per shaft. This relationship is the basis of eliminating thrust bearing loads on the shafts. The conical intersecting surface 21a, 22a, 31a of the members 21, 22, 31 are self centering in that the ball, with pressure applied thereto, always seeks the lowest point on the shafts, thus making contact with each shaft in two places. The conical surfaces have a further usefulness in that they provides a scrubbing action as a result of ball movement; thus, the mechanism is self cleaning.

As shown, the encoder and idler shafts are placed in such a manner that the ball is supported from six points, where each shaft is self centering, thus accurately locating the ball and keeping the encoder wheels centered in their cavities in the support shafts. The location of the ball relative to the axes of support shafts 21, 22 and 31 is extremely important to the operation of the present invention. If these axes are too low with respect to the centerline of the ball, the ball would tend to be pushed through the support shaft surfaces when the device is in use. On the other hand, if these axes are too high relative to the ball centerline, the ball would tend to ride off the support surfaces when the device is moved sideways. In practice, we have found that for a ball having a diameter of from 5/16 to ⅜ inches, placement of the shafts 21, 22 and 31 so that a plane through the intersection of their matching curved surfaces forms an angle of between 30 degrees and 60 degrees with the axis of the centerline of ball 13 is quite satisfactory, as shown in FIG. 5.

A concept that is of critical importance in this invention is the relationship of the coefficient of friction of the materials involved in this mechanism. The primary rule followed in the invention is that the coefficient of friction between the material of the ball and the drawing surface should be at least 2 times greater than the coefficient of friction between the ball material and the encoder and idler shaft material. Otherwise slippage may result between the ball and the drawing surface, thereby causing inconsistent operation.

Figure 6:
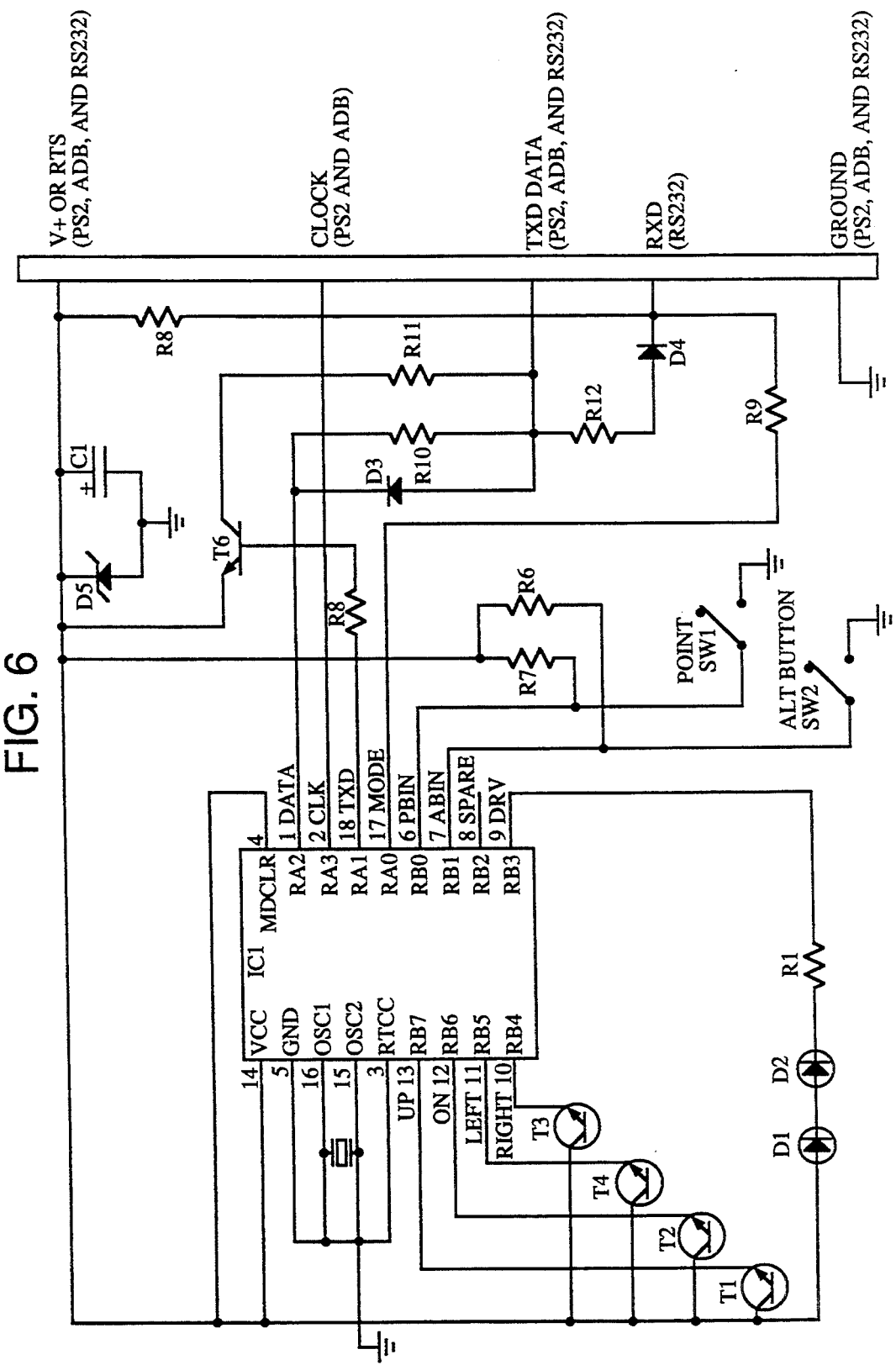
FIG. 6 is a schematic diagram of electrical circuitry which may be used with the present invention.

FIG. 6 is a schematic diagram of circuitry which may be employed to utilize the invention. All of the circuitry of FIG. 6 is generally well known. The circuitry operates in the following manner. IC1 is a microcontroller operating at a representative rate of 4 Mhz. Its primary function is to monitor activity and to report the results to the host computer. The monitoring circuitry is comprised of two infrared photo diodes, D1 and D2, corresponding to photo diodes 27, 28 in FIG. 2, with a current limiting resistor R1, which are activated for a very short period of time. After the photo diodes are activated, the microcontroller samples the state of the two pairs of photo transistors, T1, T2, T3, and T4 corresponding to photodetector pairs 29, 30 in FIG. 2. This information is then processed by the microcontroller to determine motion of ball 13 in the X and Y directions for later transmission to the host computer. The microcontroller also monitors the states of the switches SW1 and SW2 (corresponding to switches 14a, 14b in FIG. 1) which are input as a high state for released and a low state for depressed.

The microcontroller is powered through pin J1 with capacitor C1 used to filter the supply noise, while the zener diode D5 limits the input voltage not to exceed 5.6 volts with respect to host signal ground. Pin #2 connects directly to the microcontroller and is used as the clock signal for synchronous Communications and Apple ADB bus applications. Pin #3 is used to read asynchronous, synchronous, and Apple ADB data. Diode D3 is a general purpose diode used in synchronous and Apple ADB communications where the logic level on this line is high and the microcontroller communicates by pulling the line low. Resistor R10 protects the microcontroller from excessive negative voltages that may be present from pin #3. Pin #4 is dual purpose and is used to determine if the host is using asynchronous serial communications. If pin #4 is brought negative, the voltage is detected by the microcontroller and the asynchronous communication mode is entered. Diode D4 is used to prevent positive level voltages with respect to ground from being transmitted to the microcontroller during asynchronous communications, and resistor R12 limits the negative current drawn from pin #3 during asynchronous communication operation. Transistor T6 and resistors R8 and R11 are used to supply positive current to pin #3 during asynchronous communications.

We claim:

1. A device for providing input to a display device by movement of a user-operated control, comprising:
    an elongated pen-like housing adapted to be held by a user,
    a rolling ball mounted in said housing at one end thereof, said rolling ball having a single point of contact with a surface over which said device is moved by said user, said ball rolling only when it moves in contact with said surface;

a plurality of rotatable support shaft means in said housing for supporting said rolling ball, each of said rotatable support shaft means having an axis of rotation, said axes of rotation of said shafts being above the centerline of said ball when said device is in an operating position; said support shaft means being in contact with said ball and being rotated by rolling movement of said ball; and means in said housing for converting the rolling movement of said ball and the resulting rotation of said shaft means into signals representing said movement.

2. A device in accordance with claim 1 including user-operated switch means disposed in a line along the length of said pen-like housing.

3. A device in accordance with claim 1 in which the axis of rotation of each of said support shaft means is aligned in a single plane.

* * * * *